J. Weeks,
Scale Beam.
No. 97,253. Patented Nov. 23, 1869.
Fig. I.
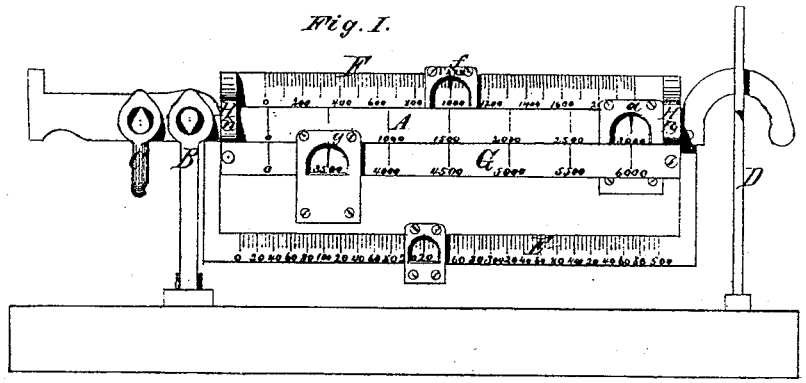
Fig. II.
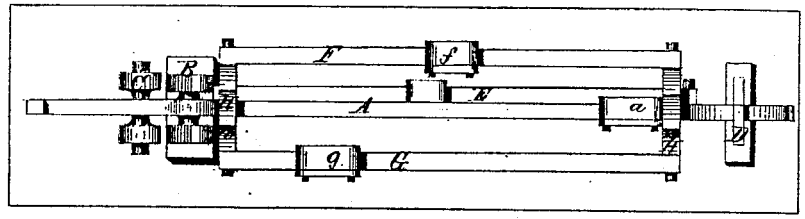
Fig. III
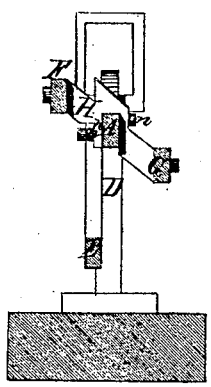
Jno. J. Bonner
Victr. H. Beckley } Witnesses.
John Weeks, Inventor.
by Forbush & Hyatt
Attys.

UNITED STATES PATENT OFFICE.

JOHN WEEKS, OF BUFFALO, NEW YORK.

IMPROVEMENT IN SCALE-BEAMS.

Specification forming part of Letters Patent No. 97,253, dated November 23, 1869; antedated November 9, 1869.

*To all whom it may concern:*

Be it known that I, JOHN WEEKS, of the city of Buffalo, in the county of Erie and State of New York, have invented certain new and useful Improvements in Scale-Beams, of which the following is a specification.

My improvements relate to heavy platform-scales, such as are employed in weighing railroad-cars and other heavy articles. In constructing such scales it has been customary to employ, in addition to the main scale-beam, a lesser or "pound scale," as it is termed, more minutely divided for weighing the fractions between the greater divisions of the former. A third or tare beam, for indicating the weight of the car or other vehicle or receptacle, has also been used. With large scales of this description great difficulty is experienced in adjusting the poise of the large beam on account of its great weight. To obviate this difficulty a device has been patented in which two or more main scale-beams are employed, having equal poises of lesser weight, with the scales graduated and numbered alike. To weigh with this scale an article which exceeds the capacity of one of these main beams requires that the weights indicated on the different main scales be added together to determine the weight of the article on the platform.

One of the features of my invention consists in graduating and numbering two or more scale-beams of a weighing apparatus, so that the numbering of one will commence where the other terminates, or, in other words, so numbering the different beams that there will be a continued progression from one to the other or others, whereby the number at which the poise on the last scale-beam used is adjusted will indicate the sum of the weights balanced by all of the beams of the series.

Another feature of my invention consists in the peculiar manner of connecting and securing the different beams to the main lever, which I accomplish by screwing them at each end to a saddle that is fastened transversely on the main lever, as will hereinafter be more fully described.

In the accompanying drawings, Figure I is a side elevation. Fig. II is a plan, and Fig. III is a cross-section of the scale-beams, showing the manner of attaching them together.

Like letters of reference designate like parts in each of the figures.

A is the main beam or lever, having its fulcrum in the top of the forked standard B; C, the rod connecting with the platform beneath.

D is a standard, with a loop at the upper end, which forms a rest for the opposite end of the scale-beam, and a stop to limit its vibration.

E is the pound scale-beam arranged beneath the lever A and formed with a right-angled arm at each end, by which it is attached to the latter by screws, as shown.

F is the tare-beam graduated and provided with a poise, *f*, for weighing the car or other receptacle or for indicating its weight when already known.

G is a fourth beam which, with the tare-beam, is secured to the beam A by means of a saddle, H, at each end, as will hereinafter be more fully explained.

The divisions of the scale-beam G are marked to correspond with those on the beam A, but numbered so that the highest number (3,000, as shown,) on the beam A shall be 0 on this beam, the numbers increasing with the same progression as on the former scale, the highest number of the second scale being 6,000, the weight or capacity of both beams.

The numbering of the scale of a third main beam, if one were used, would commence with 0, indicating 6,000, and terminate at 9,000, and so on, according as more beams are used, the whole of the series, so far as relates to the numbering, forming but a single continued scale, the highest number on the last beam indicating the largest weight the machine will balance.

The poises *a g* of the beams A G are of equal weight, and in this case are of one-half of the weight which would be required if a single main beam only was employed. An increase in the number of these beams would evidently reduce the weight of the poises in a corresponding proportion.

The importance of this method of numbering the series of beams A G, so as to dispense with the adding of the weights of the different beams when they are numbered alike, and thereby prevent the mistakes which would otherwise occur, is obvious.

The beams A F G are arranged side by side sufficiently far apart to permit the adjustment of the poises, and are elevated one above the other like seats, so as to expose to the attendant in front, the different scales thereof, as represented in Fig. I.

The beams F G are screwed to the ends of the saddles H, while the latter themselves have a notch, $h$, cut obliquely in the under edge of the saddle to fit the beam on which it rests, and to which it is fastened by screws $n$, as shown in the drawings. This mode of attachment is firm, more simple, and much cheaper than the ordinary methods in use, and enables the parts to be adjusted with great accuracy.

What I claim as my invention is—

1. The combination, in a weighing-machine, of two or more scale-beams, A G, when the numbers thereon form a progressive series from one to the other, so as to operate as one continued scale, substantially as and for the purpose hereinbefore set forth.

2. The saddles H H, constructed as described, when arranged with the scale-beams A F G, substantially in the manner and for the purpose hereinbefore set forth.

JOHN WEEKS.

Witnesses:
 JNO. J. BONNER,
 VICTOR A. BECKER.